US012597849B2

(12) United States Patent
Fujimaki et al.

(10) Patent No.: US 12,597,849 B2
(45) Date of Patent: Apr. 7, 2026

(54) DRIVING DEVICE, SWITCHING POWER SUPPLY APPARATUS, AND VEHICLE

(71) Applicant: ROHM CO., LTD., Kyoto (JP)

(72) Inventors: Takumi Fujimaki, Kyoto (JP); Yuta Shiroishi, Kyoto (JP); Satoru Nate, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 18/887,537

(22) Filed: Sep. 17, 2024

(65) Prior Publication Data

US 2025/0015704 A1     Jan. 9, 2025

Related U.S. Application Data

(63) Continuation of application No. PCT/JP2023/003558, filed on Feb. 3, 2023.

(30) Foreign Application Priority Data

Mar. 25, 2022     (JP) ................................. 2022-049897

(51) Int. Cl.
| | |
|---|---|
| *H02M 1/08* | (2006.01) |
| *B60R 16/03* | (2006.01) |
| *H02M 1/00* | (2006.01) |
| *H02M 3/28* | (2006.01) |
| *H02M 3/335* | (2006.01) |
| *H02M 1/44* | (2007.01) |

(52) U.S. Cl.
CPC .............. *H02M 1/08* (2013.01); *B60R 16/03* (2013.01); *H02M 1/0054* (2021.05); *H02M 3/33523* (2013.01); *H02M 1/44* (2013.01)

(58) Field of Classification Search
CPC .. H02M 1/08; H02M 1/0054; H02M 3/33523; H02M 1/44; H02M 1/36; H02M 3/28; B60R 16/03
USPC .......................................................... 307/9.1
See application file for complete search history.

(56) References Cited

U.S. PATENT DOCUMENTS

| | | | | |
|---|---|---|---|---|
| 2013/0169322 A1* | 7/2013 | Shen | ........................ | H04L 25/08 |
| | | | | 327/109 |
| 2020/0220489 A1* | 7/2020 | Nakamura | .............. | H02M 1/14 |

FOREIGN PATENT DOCUMENTS

JP          2018-129907          8/2018

OTHER PUBLICATIONS

International Search Report and Written Opinion in International Appln. No. PCT/JP2023/003558, mailed on Apr. 4, 2023, 14 pages (with machine translation).

* cited by examiner

*Primary Examiner* — Rexford N Barnie
*Assistant Examiner* — Xuan Ly
(74) *Attorney, Agent, or Firm* — Fish & Richardson P.C.

(57)          ABSTRACT

A driving device is configured to drive a switching element. The driving device includes a variation unit configured to vary a current supply capability with respect to a control terminal of the switching element during a period from startup to shutdown of the driving device.

14 Claims, 7 Drawing Sheets

DRIVING DEVICE, SWITCHING POWER SUPPLY APPARATUS, AND VEHICLE

CROSS-REFERENCE TO RELATED APPLICATIONS

This nonprovisional application is a continuation application of International Patent Application No. PCT/JP2023/003558 filed on Feb. 3, 2023, which claims priority Japanese Patent Application No. 2022-049897 filed in Japan on Mar. 25, 2022, the entire contents of which are hereby incorporated by reference.

BACKGROUND OF THE INVENTION

1. Technical Field

The disclosure herein relates to a driving device that drives a switching element and to a switching power supply apparatus and a vehicle each including the driving device.

2. Description of Related Art

In switching power supply apparatuses, there may appear a peak in EMI (Electromagnetic Interference) noise.

As measures against EMI noise in a driving device that drives a switching element in such a switching power supply apparatus, conventionally used are techniques described below.

A noise peak in a low frequency range (several tens of kHz to several MHz) is suppressed by equipping the switching power supply apparatus with a function of performing spectrum spreading of a switching frequency (see, for example, Japanese Unexamined Patent Application Publication No. 2018-129907).

On the other hand, a noise peak in a high frequency range (a frequency range not lower than several tens of MHz) is suppressed by reducing a current capability of the driving device that drives the switching element so as to decrease a slew rate of a drain voltage of the switching element.

DESCRIPTION OF EMBODIMENTS

In the present description, a MOSFET [metal oxide semiconductor field effect transistor] refers to a field-effect transistor having a gate structure composed of at least three layers that are a "layer of an electric conductor or a semiconductor having a small resistance value such as polysilicon," an "insulation layer," and a "P-type, N-type, or intrinsic semiconductor layer." That is, the gate structure of the MOSFET is not limited to a three layer structure composed of a metal, an oxide, and a semiconductor.

In the present description, a constant voltage refers to a voltage that is constant in an ideal state and is practically a voltage that may slightly vary depending on a temperature change or the like.

In the present description, a constant current refers to a current that is constant in an ideal state and is practically a current that may slightly vary depending on a temperature change or the like.

Switching Power Supply Apparatus (First Embodiment)

Figure 1:
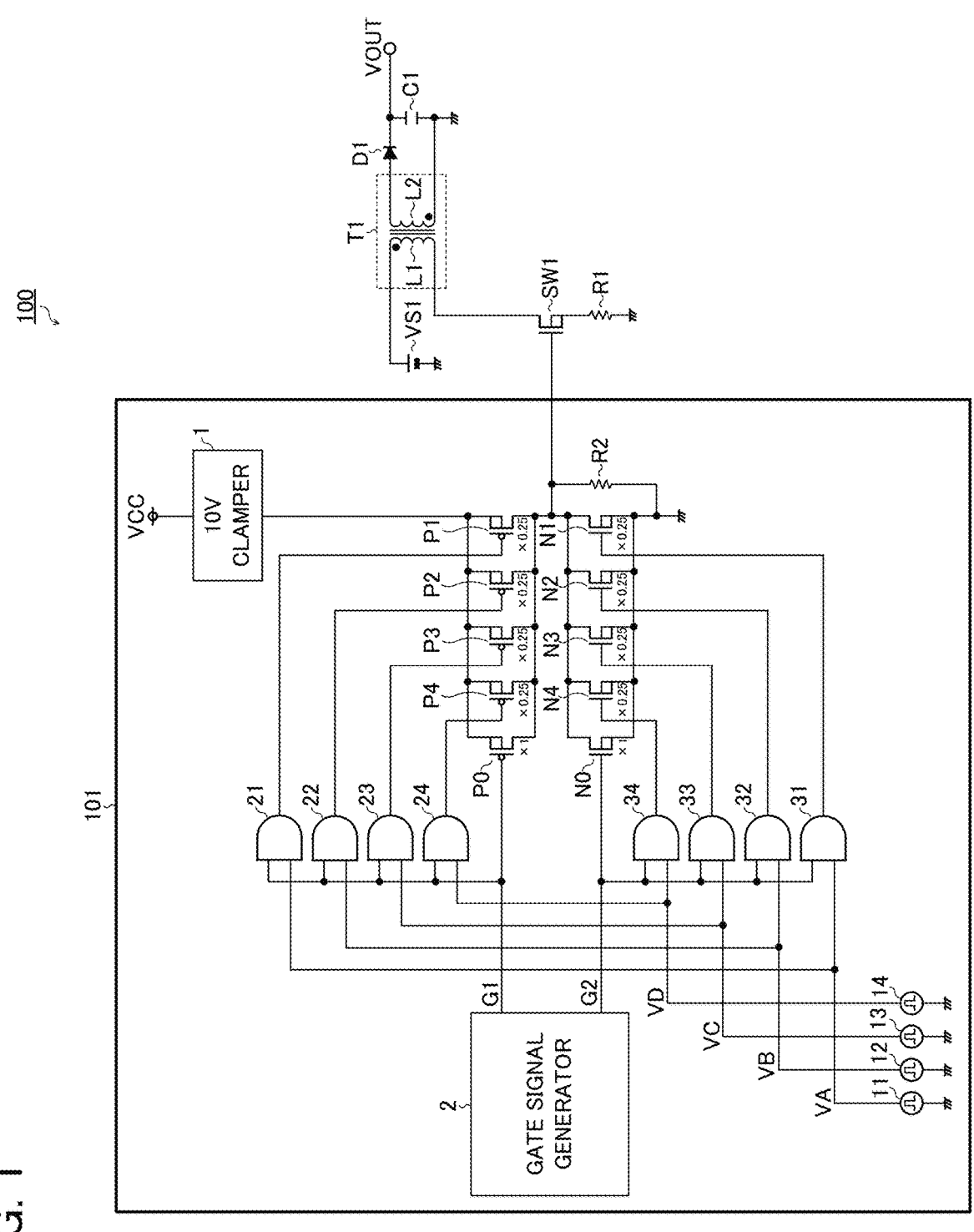
FIG. 1 is a diagram showing a configuration of a switching power supply apparatus according to a first embodiment.

FIG. 1 is a diagram showing a configuration of a switching power supply apparatus according to a first embodiment. A switching power supply apparatus 100 according to this embodiment includes a driving device 101, a switching element SW1, a resistor R1, a transformer T1, a diode D1, and an output capacitor C1.

The driving device 101 is configured to drive the switching element SW1. In this embodiment, the driving device 101 is formed of a gate driver IC (Integrated Circuit). An internal configuration of the driving device 101 will be described later.

In this embodiment, the switching element SW1 is formed of an N-channel MOSFET.

A source of the switching element SW1 is connected to a ground potential via the resistor R1. A drain of the switching element SW1 is connected to a first end of a primary winding L1 of the transformer T1. A second end of the primary winding L1 is connected to a positive electrode of a voltage source VS1. A negative electrode of the voltage source VS1 is connected to the ground potential.

A first end of a secondary winding L2 of the transformer T1 is connected to an anode of the diode D1. A cathode of the diode D1 is connected to a first end of the output capacitor C1. A second end of the output capacitor C1 is connected to a second end of the secondary winding L2 and the ground potential.

When the switching element SW1 is turned on by the driving device 101, a primary current flows from the voltage source VS1 toward the ground potential via the primary winding L1, the switching element SW1, and the resistor R1. As a result of the primary current flowing in this manner, electric energy is stored in the primary winding L1.

On the other hand, when the switching element SW1 is turned off by the driving device 101, an induced voltage is generated in the secondary winding L2 electromagnetically coupled to the primary winding L1, so that a secondary current flows from the secondary winding L2 to the diode D1. At this time, a half-wave rectified voltage outputted from the diode D1 is smoothed by the output capacitor C1, thus being converted into a direct-current output voltage VOUT.

Next, a description is given of the internal configuration of the driving device 101. The driving device 101 includes a clamper 1, a gate signal generator 2, pulse signal generators 11 to 14, AND gates 21 to 24 and 31 to 34, transistors P0 to P4 and N0 to N4, and a pull-down resistor R2.

A variation unit provided in the driving device 101 is composed of the pulse signal generators 11 to 14, the AND gates 21 to 24 and 31 to 34, and the transistors P1 to P4 and N1 to N4. The variation unit varies a current supply capability with respect to a control terminal (a gate) of the switching element SW1 during a period from startup to shutdown of the driving device 101.

In this embodiment, the transistors P0 to P4 are each a P-channel MOSFET, and the transistors N0 to N4 are each an N-channel MOSFET.

A constant voltage VCC is applied to a first end of the clamper 1. A second end of the clamper 1 is connected to respective sources of the transistors P0 to P4. Respective drains of the transistors P0 to P4 are connected to respective drains of the transistors N0 to N4, a first end of the pull-down resistor R2, and the control terminal (the gate) of the switching element SW1. Respective sources of the transistors N0 to N4 are connected to a second end of the pull-down resistor R2 and the ground potential.

The clamper 1 clamps the respective sources of the transistors P0 to P4 to, for example, 10V.

The gate signal generator 2 generates gate signals G1 and G2. For example, based on the output voltage VOUT or a divided voltage of the output voltage VOUT, the gate signal generator 2 generates the gate signals G1 and G2. The gate signal G2 is a complementary signal of the gate signal G1. That is, when the gate signal G1 is at a high level, the gate signal G2 is at a low level, while when the gate signal G1 is at the low level, the gate signal G2 is at the high level.

The gate signal G1 is supplied to a gate of the transistor P0.

An output signal of the AND gate 21 is supplied to a gate of the transistor P1. The AND gate 21 outputs a signal that is a logical product between the gate signal G1 and a pulse signal VA outputted from the pulse signal generator 11.

An output signal of the AND gate 22 is supplied to a gate of the transistor P2. The AND gate 22 outputs a signal that is a logical product between the gate signal G1 and a pulse signal VB outputted from the pulse signal generator 12.

An output signal of the AND gate 23 is supplied to a gate of the transistor P3. The AND gate 23 outputs a signal that is a logical product between the gate signal G1 and a pulse signal VC outputted from the pulse signal generator 13.

An output signal of the AND gate 24 is supplied to a gate of the transistor P4. The AND gate 24 outputs a signal that is a logical product between the gate signal G1 and a pulse signal VD outputted from the pulse signal generator 14.

At a time of turning on the switching element SW1, the transistors P1 to P4 are individually controlled to perform current supply to the control terminal (the gate) of the switching element SW1 and not to perform the current supply thereto.

The gate signal G2 is supplied to a gate of the transistor N0.

An output signal of the AND gate 31 is supplied to a gate of the transistor N1. The AND gate 31 outputs a signal that is a logical product between the gate signal G2 and the pulse signal VA outputted from the pulse signal generator 11.

An output signal of the AND gate 32 is supplied to a gate of the transistor N2. The AND gate 32 outputs a signal that is a logical product between the gate signal G2 and the pulse signal VB outputted from the pulse signal generator 12.

An output signal of the AND gate 33 is supplied to a gate of the transistor N3. The AND gate 33 outputs a signal that is a logical product between the gate signal G2 and the pulse signal VC outputted from the pulse signal generator 13.

An output signal of the AND gate 34 is supplied to a gate of the transistor N4. The AND gate 34 outputs a signal that is a logical product between the gate signal G2 and the pulse signal VD outputted from the pulse signal generator 14.

At a time of turning off the switching element SW1, the transistors N1 to N4 are individually controlled to perform current supply to the control terminal (the gate) of the switching element SW1 and not to perform the current supply thereto.

Figure 2:
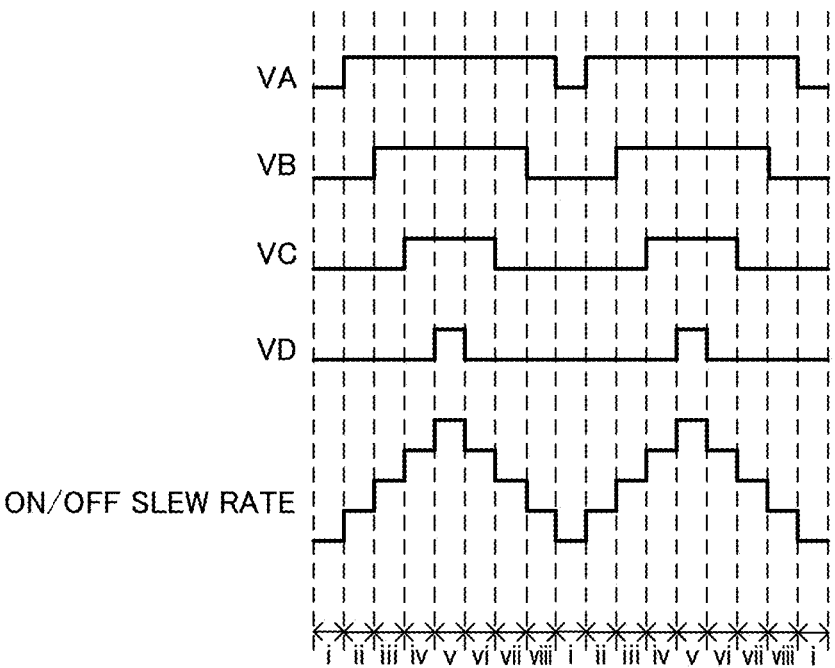
FIG. 2 is a diagram showing an ON/OFF slew rate of a switching element of the switching power supply apparatus shown in FIG. 1.

In the driving device 101, for example, when the pulse signals VA to VD outputted respectively from the pulse signal generators 11 to 14 are set as shown in FIG. 2, a slew rate of a drain voltage of the switching element SW1 at the time of turning on the switching element SW1 repeatedly varies to gradually increase and then gradually decrease. Furthermore, in the driving device 101, for example, when the pulse signals VA to VD outputted respectively from the pulse signal generators 11 to 14 are set as shown in FIG. 2, a slew rate of a drain voltage of the switching element SW1 at the time of turning off the switching element SW1 repeatedly varies to gradually increase and then gradually decrease.

The transistor P0 has a current supply capability with respect to the control terminal (the gate) of the switching element SW1 larger than a current supply capability of each of the transistors P1 to P4 with respect to the control terminal (the gate) of the switching element SW1. For example, in FIG. 1, in a case where the transistors P0 to P4 have equal gate-source voltages, the transistor P0 has a drain current four times as large as a drain current of each of the transistors P1 to P4. For currents (source currents) emitted from transistors to the control terminal (the gate) of the switching element SW1, current supply capabilities of the transistors correspond, at a minimum, to the current supply capability of the transistor P0 and, at a maximum, to a sum of the current supply capabilities of the transistors P0 to P4. The number of transistors connected in parallel to the transistor P0 may be any number other than four.

The transistor N0 has a current supply capability with respect to the control terminal (the gate) of the switching element SW1 larger than a current supply capability of each of the transistors N1 to N4 with respect to the control terminal (the gate) of the switching element SW1. For example, in FIG. 1, in a case where the transistors N0 to N4 have equal gate-source voltages, the transistor N0 has a drain current four times as large as a drain current of each of the transistors N1 to N4. For currents (sink currents) sunk from the control terminal (the gate) of the switching element SW1 to transistors, current supply capabilities of the transistors correspond, at a minimum, to the current supply capability of the transistor N0 and, at a maximum, to a sum of the current supply capabilities of the transistors N0 to N4. The number of transistors connected in parallel to the transistor N0 may be any number other than four.

The driving device 101 repeats sections i to viii of time multiple times during a period from startup to shutdown. Though not particularly limited, a length of each of the sections i to viii can be set to correspond to, for example, a switching cycle of the switching element SW1.

In the section i, the pulse signals VA to VD are at a low level.

In the section ii subsequent to the section i, the pulse signal VA is at a high level, and the pulse signals VB to VD are at the low level.

In the section iii subsequent to the section ii, the pulse signals VA and VB are at the high level, and the pulse signals VC and VD are at the low level.

In the section iv subsequent to the section iii, the pulse signals VA to VC are at the high level, and the pulse signal VD is at the low level.

In the section v subsequent to the section iv, the pulse signals VA to VD are at the high level.

In the section vi subsequent to the section v, the pulse signals VA to VC are at the high level, and the pulse signal VD is at the low level.

In the section vii subsequent to the section vi, the pulse signals VA and VB are at the high level, and the pulse signals VC and VD are at the low level.

In the section viii subsequent to the section vii, the pulse signal VA is at the high level, and the pulse signals VB to VD are at the low level.

The driving device 101 operates as above to vary a current supply capability with respect to the control terminal (the gate) of the switching element SW1 during a period from startup to shutdown of the driving device 101. In the driving device 101, while switching loss of the switching element SW1 depends on an average current supply capability of the driving device 101, a switching noise level of the switching element SW1 is suppressed better than in a case where the current supply capability is fixed to the average current supply capability of the driving device 101.

Figure 3:
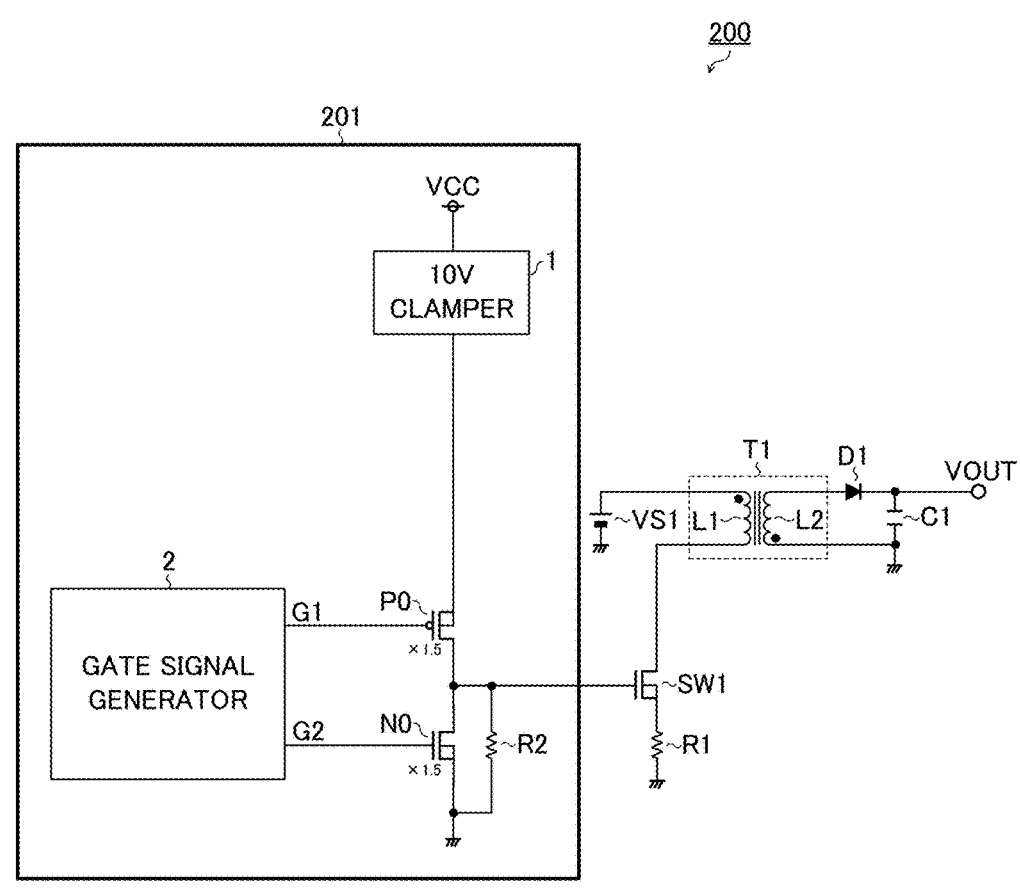
FIG. 3 is a diagram showing a configuration of a switching power supply apparatus according to a comparative example.

That is, the driving device 101 is capable of suppressing loss and noise of the switching element SW1 better than a driving device 201 used in a switching power supply apparatus 200 according to a comparative example shown in FIG. 3. The driving device 201 has a configuration obtained by excluding the variation unit from the driving device 101, in which transistors P0 and N0 each have a current supply capability 1.5 times as large as that in the driving device 101. The driving device 101 is capable of suppressing the switching loss of the switching element SW1 to a level equal to that achieved by the driving device 201 and suppressing the switching noise level of the switching element SW1 better than the driving device 201.

Figure 4:
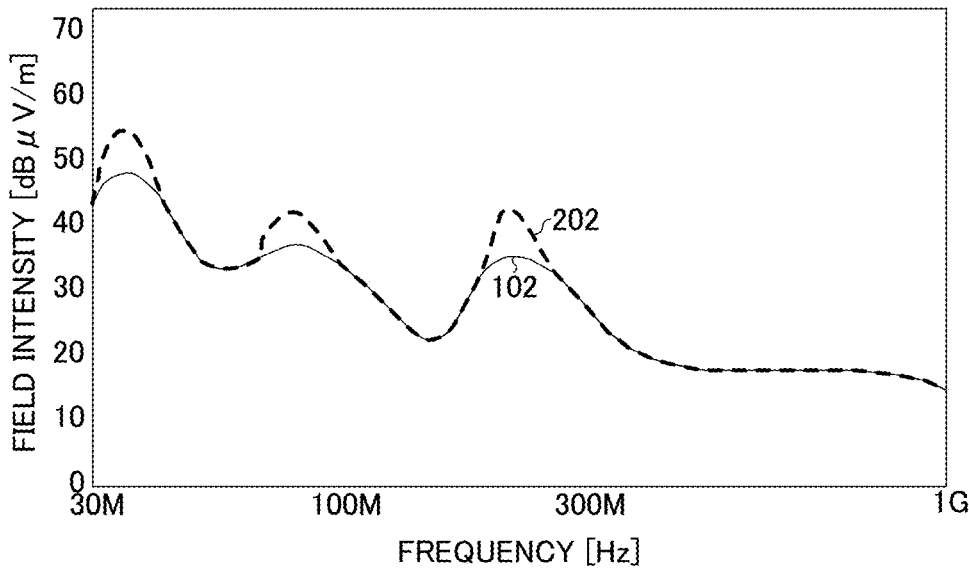
FIG. 4 is a diagram showing EMI noise.

FIG. 4 is a diagram showing an EMI noise characteristic 102 of the switching power supply apparatus 100 according to this embodiment and an EMI noise characteristic 202 of the switching power supply apparatus 200 according to the comparative example. As is apparent from FIG. 4, the driving device 101 is capable of reducing a peak level of EMI noise better than the driving device 201.

Furthermore, in the above-described driving device 101, the current supply capability with respect to the control terminal (the gate) of the switching element SW1 is varied regularly. This eliminates the need of a random number generation circuit or the like and thus simplifies a circuit configuration of the driving device 101. There may be adopted a configuration in which, unlike in this embodiment, the current supply capability with respect to the control terminal (the gate) of the switching element SW1 randomly varies.

Furthermore, there may be adopted a configuration in which, unlike in this embodiment, either the AND gates 21 to 24 and the transistors P1 to P4 or the AND gates 31 to 34 and the transistors N1 to N4 are excluded from the driving device 101.

Switching Power Supply Apparatus (Second Embodiment)

Figure 5:
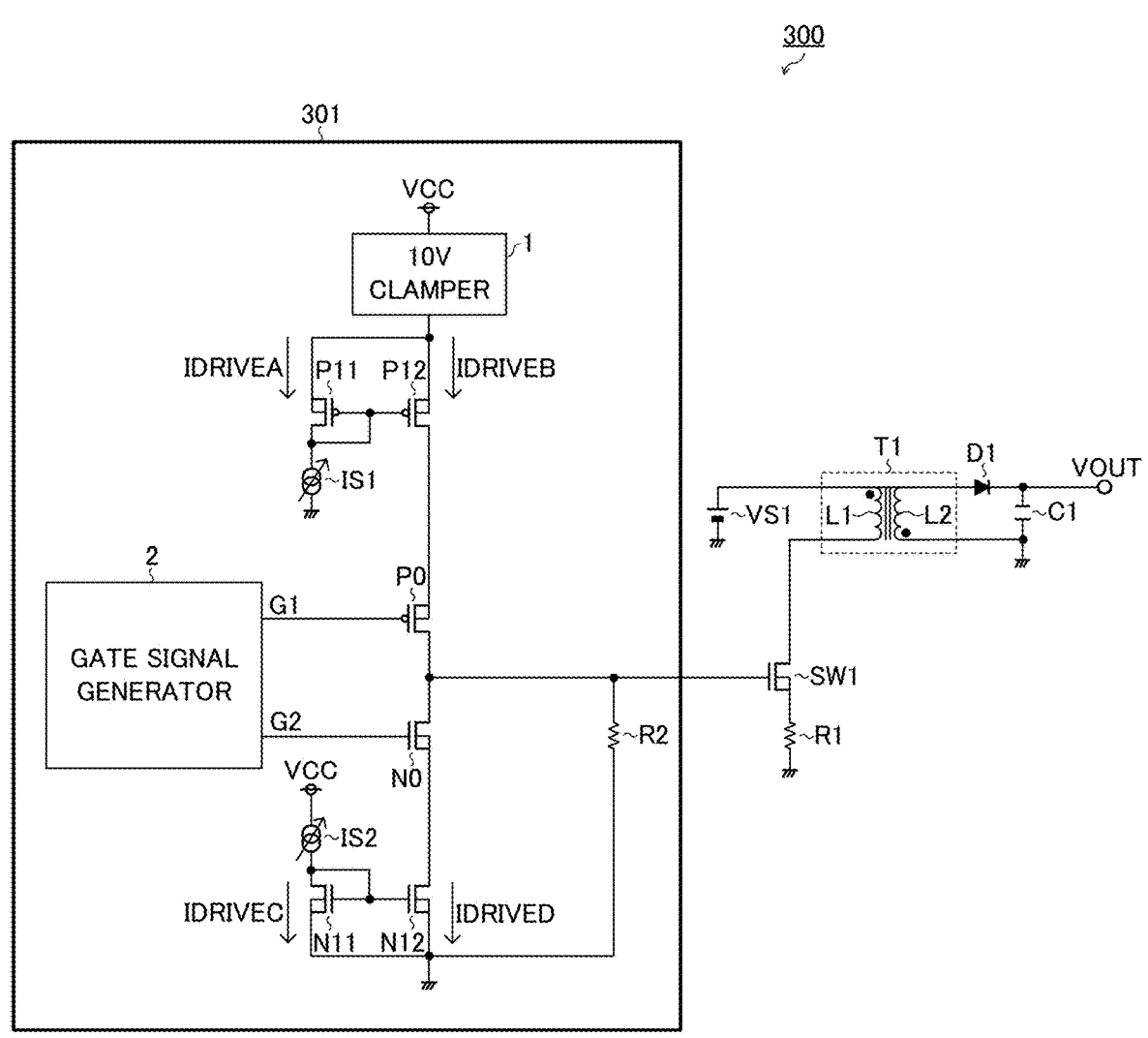
FIG. 5 is a diagram showing a configuration of a switching power supply apparatus according to a second embodiment.

FIG. 5 is a diagram showing a configuration of a switching power supply apparatus according to a second embodiment. In FIG. 5, like reference signs denote like parts as in FIG. 1, which, therefore, will not be described in detail. A switching power supply apparatus 300 according to this embodiment includes a driving device 301, a switching element SW1, a resistor R1, a transformer T1, a diode D1, and an output capacitor C1.

The driving device 301 is configured to drive the switching element SW1. In this embodiment, the driving device 301 is formed of a gate driver IC.

When the switching element SW1 is turned on by the driving device 301, a primary current flows from a voltage source VS1 toward a ground potential via a primary winding L1, the switching element SW1, and the resistor R1. As a result of the primary current flowing in this manner, electric energy is stored in the primary winding L1.

On the other hand, when the switching element SW1 is turned off by the driving device 301, an induced voltage is generated in a secondary winding L2 electromagnetically coupled to the primary winding L1, so that a secondary current flows from the secondary winding L2 to the diode D1. At this time, a half-wave rectified voltage outputted from the diode D1 is smoothed by the output capacitor C1, thus being converted into a direct-current output voltage VOUT.

Next, a description is given of an internal configuration of the driving device 301. The driving device 301 includes a clamper 1, a gate signal generator 2, transistors P0, P11, P12, N0, N11, and N12, variable current sources IS1 and IS2, and a pull-down resistor R2.

A variation unit provided in the driving device 301 is composed of the transistors P11, P12, N11, and N12 and the variable current sources IS1 and IS2. The variation unit varies a current supply capability with respect to a control terminal (a gate) of the switching element SW1 during a period from startup to shutdown of the driving device 301.

In this embodiment, the transistors P0, P11, and P12 are each a P-channel MOSFET, and the transistors N0, N11, and N12 are each an N-channel MOSFET.

A constant voltage VCC is applied to a first end of the clamper 1. A second end of the clamper 1 is connected to respective sources of the transistors P11 and P12. A gate of the transistor P11, a gate of the transistor P12, and a drain of the transistor P11 are connected to a first end of the variable current source IS1. A second end of the variable current source IS1 is connected to the ground potential. A drain of the transistor P12 is connected to a source of the transistor P0. A current mirror circuit composed of the transistors P11 and P12 supplies, to the transistor P0, a mirror current IDRIVEB obtained by mirroring an output current IDRIVEA of the variable current source IS1.

A drain of the transistor N12 is connected to a source of the transistor N0. A constant voltage VCC is applied to a first end of the variable current source IS2. A second end of the variable current source IS2 is connected to a drain of the transistor N11, a gate of the transistor N11, and a gate of the transistor N12. A source of the transistor N11, a source of the transistor N12, and a second end of the pull-down resistor R2 are connected to the ground potential. A current mirror circuit composed of the transistors N11 and N12 supplies, to the transistor N0, a mirror current IDRIVED obtained by mirroring an output current IDRIVEC of the variable current source IS2.

The clamper 1 clamps the respective sources of the transistors P11 and P12 to, for example, 10 V.

Figure 6:
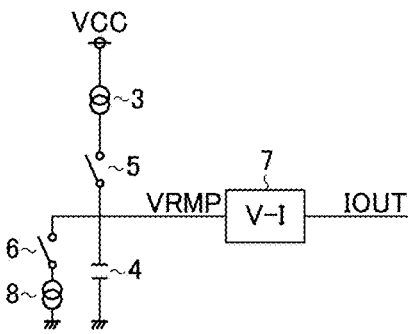
FIG. 6 is a diagram showing a configuration example of a variable current source.

Each of the variable current sources IS1 and IS2 can be configured, for example, as shown in FIG. 6. A variable current source according to a configuration example shown in FIG. 6 includes a constant current source 3, a capacitor 4, switches 5 and 6, a voltage-current conversion circuit 7, and a constant current source 8. The switches 5 and 6 are complementarily and cyclically turned on/off. When the switch 5 is an on state, the capacitor 4 is charged using a constant current outputted from the constant current source 3. On the other hand, when the switch 6 is in the on state, the capacitor 4 is discharged using a constant current outputted from the constant current source 8. With this configuration, a voltage VRMP outputted from the capacitor 4 cyclically increases and decreases in a repeated manner. The voltage-current conversion circuit 7 converts the voltage VRMP outputted from the capacitor 4 into a current IOUT. The current IOUT outputted from the voltage-current conversion circuit 7 is outputted as an output current of the variable current source.

Figure 7:
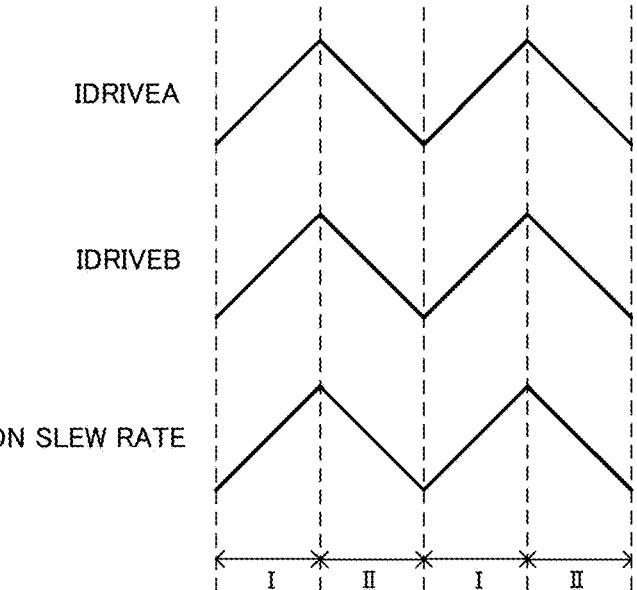
FIG. 7 is a diagram showing an ON slew rate of a switching element of the switching power supply apparatus shown in FIG. 5.
Figure 8:
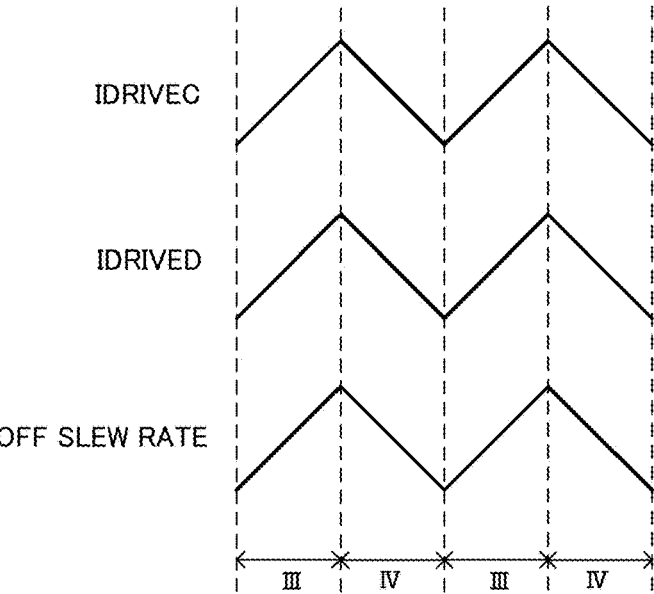
FIG. 8 is a diagram showing an OFF slew rate of the switching element of the switching power supply apparatus shown in FIG. 5.

In the driving device 301, for example, when the current IDRIVEA outputted from the variable current source IS1 cyclically changes as shown in FIG. 7, a slew rate of a drain voltage of the switching element SW1 at a time of turning on the switching element SW1 also cyclically changes. Furthermore, in the driving device 301, for example, when the current IDRIVEC outputted from the variable current source IS2 cyclically changes as shown in FIG. 8, a slew rate of a drain voltage of the switching element SW1 at a time of turning off the switching element SW1 also cyclically changes.

The driving device 301 repeats sections I and II of time multiple times during a period from startup to shutdown. Though not particularly limited, a length of each of the sections I and II can be set to correspond to, for example, a switching cycle of the switching element SW1. Furthermore, the driving device 301 repeats sections III and IV of time multiple times during the period from startup to shutdown. Though not particularly limited, a length of each of the sections III and IV can be set to correspond to, for example, the switching cycle of the switching element SW1.

In the section I, the current IDRIVEA increases, and when the transistor P0 is in the on state, the mirror current IDRIVEB also increases. On the other hand, in the section II subsequent to the section I, the current IDRIVEA decreases, and when the transistor P0 is in the on state, the mirror current IDRIVEB also decreases.

In the section III, the current IDRIVEC increases, and when the transistor NO is in the on state, the mirror current IDRIVED also increases. On the other hand, in the section IV subsequent to the section III, the current IDRIVEC decreases, and when the transistor N0 is in the on state, the mirror current IDRIVED also decreases.

The driving device 301 operates as above to vary the current supply capability with respect to the control terminal (the gate) of the switching element SW1 during a period from startup to shutdown of the driving device 301. In the driving device 301, while switching loss of the switching element SW1 depends on an average current supply capability of the driving device 301, a switching noise level of the switching element SW1 is suppressed better than in a case where the current supply capability is fixed to the average current supply capability of the driving device 301.

Application Example of Switching Power Supply Apparatus

Figure 9:
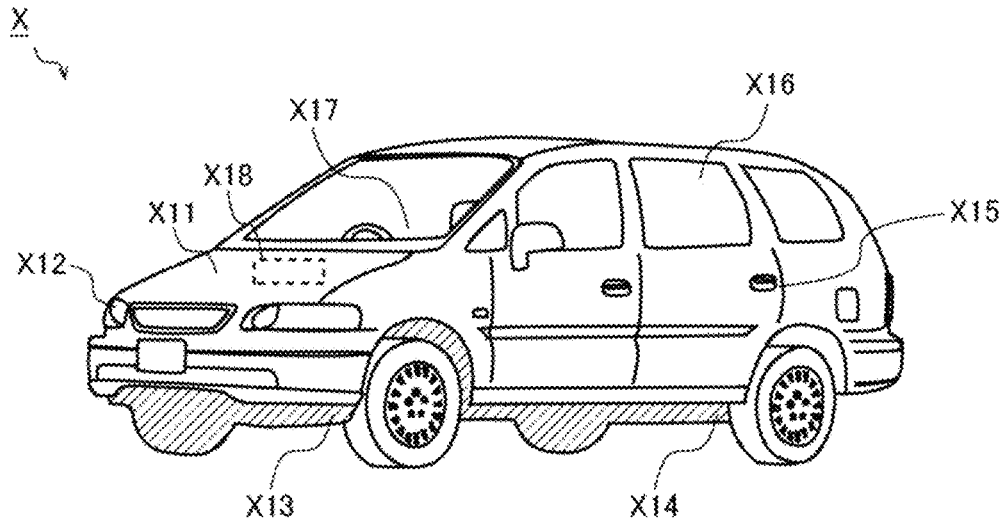
FIG. 9 is an external appearance view of a vehicle.

FIG. 9 is an external appearance view of a vehicle X. The vehicle X shown in FIG. 9 mounts therein various pieces of electronic equipment X11 to X18 that operate upon receipt of supply of voltages outputted from an unshown battery. For the sake of convenience of drawing, respective mounting positions of the pieces of electronic equipment X11 to X18 shown in this figure may be different from actual mounting positions thereof.

The electronic equipment X11 is an engine control unit that performs engine-related control (such as injection control, electronic throttle control, idling control, oxygen sensor heater control, and auto cruise control).

The electronic equipment X12 is a lamp control unit that controls turning on/off of an HID [high intensity discharged lamp], a DRL [daytime running lamp], and so on.

The electronic equipment X13 is a transmission control unit that performs transmission-related control.

The electronic equipment X14 is a brake unit that performs control related to motion of the vehicle X (such as ABS [anti-lock brake system] control and electronic suspension control).

The electronic equipment X15 is a security control unit that performs drive control of a door lock, an anti-theft alarm, and so on.

The electronic equipment X16 includes pieces of electronic equipment incorporated in the vehicle X at a factory shipping stage as standard equipment or manufacturer optional items, such as a wiper, an electric door mirror, a power window, a damper (a shock absorber), an electric sunroof, and an electric seat.

The electronic equipment X17 includes pieces of electronic equipment optionally mounted in the vehicle X as user optional items, such as in-vehicle A/V [audio/visual] equipment, a car navigation system, an ETC [electronic toll collection system], and an in-vehicle camera module.

The electronic equipment X18 includes pieces of electronic equipment provided with a high withstand voltage motor, such as an EPS [Electric Power Steering], an in-vehicle blower, an oil pump, a water pump, and a battery cooling fan.

The earlier described switching power supply apparatuses can each be incorporated in any of the pieces of electronic equipment X11 to X18.

The foregoing embodiments are to be construed in all respects as illustrative and not limiting. It is to be understood that the technical scope of the disclosure herein is indicated by the appended claims rather than by the description of the foregoing embodiments, and all changes that come within the meaning and range of equivalency of the claims are intended to be embraced therein.

For example, the first embodiment and the second embodiment may be implemented in combination with each other. That is, in the driving device 101, in place of the AND gates 31 to 34 and the transistors N1 to N4, the variable current source IS2, the transistor N11, and the transistor N12 may be provided. Furthermore, in the driving device 101, in place of the AND gates 21 to 24 and the transistors P1 to P4, the variable current source IS1, the transistor P11, and the transistor P12 may be provided.

Furthermore, for example, while the earlier described switching power supply apparatuses are each configured to include a transformer, the disclosure herein is applicable also to a transformerless switching power supply apparatus. Examples of the transformerless switching power supply apparatus include a boost chopper switching power supply apparatus.

Furthermore, for example, while the earlier described switching power supply apparatuses are each configured so that a switching element is externally connected to an IC, the switching element may be built into the IC.

A driving device (101, 301) as described thus far is a driving device configured to drive a switching element (SW1) and has a configuration (a first configuration) including a variation unit (11 to 14, 21 to 24, 31 to 34, P1 to P4, N1 to N4, IS1, P11, P12, IS2, N11, N12) configured to vary a current supply capability with respect to a control terminal of the switching element during a period from startup to shutdown of the driving device.

The driving device according to the above-described first configuration is capable of suppressing loss and noise of the switching element.

The driving device according to the above-described first configuration may have a configuration (a second configuration) in which the variation unit (101) includes at least either a plurality of first transistors (P1 to P4) configured to be individually controlled, at a time of turning on the switching element, to perform current supply to the control terminal and not to perform the current supply thereto or a plurality of second transistors (N1 to N4) configured to be individually controlled, at a time of turning off the switching element, to perform current supply to the control terminal and not to perform the current supply thereto.

The driving device according to the above-described second configuration is capable of easily and gradually varying the current supply capability with respect to the control terminal of the switching element.

The driving device according to the above-described second configuration may have a configuration (a third configuration) including the plurality of first transistors and a third transistor (P0) configured to perform current supply to the control terminal at the time of turning on the switching element, in which the third transistor has a current supply capability with respect to the control terminal larger than a current supply capability of each of the plurality of first transistors with respect to the control terminal.

In the driving device according to the above-described third configuration, at the time of turning on the switching element, a base level of the current supply capability can be determined by the third transistor, and amounts of variation in the current supply capability can be determined by the first transistors.

The driving device according to the above-described second or third configuration may have a configuration (a fourth configuration) including the plurality of second transistors and a fourth transistor (N0) configured to perform current supply to the control terminal at the time of turning off the switching element, in which the fourth transistor has a current supply capability with respect to the control terminal larger than a current supply capability of each of the plurality of second transistors with respect to the control terminal.

In the driving device according to the above-described fourth configuration, at the time of turning off the switching element, a base level of the current supply capability can be determined by the fourth transistor, and amounts of variation in the current supply capability can be determined by the second transistors.

The driving device according to the above-described first configuration may have a configuration (a fifth configuration) in which the variation unit (301) includes at least either a first variable current source (IS1) and a first current mirror circuit (P11, P12) configured to supply a mirror current obtained by mirroring an output current of the first variable current source to a turn-on transistor configured to perform current supply to the control terminal at a time of turning on the switching element or a second variable current source (IS2) and a second current mirror circuit (N11, N12) configured to supply a mirror current obtained by mirroring an output current of the second variable current source to a turn-off transistor configured to perform current supply to the control terminal at a time of turning off the switching element.

The driving device according to the above-described fifth configuration is capable of easily and continuously varying the current supply capability with respect to the control terminal of the switching element.

The driving device according to any of the above-described first to fifth configurations may have a configuration (a sixth configuration) in which the variation unit is configured to regularly vary the current supply capability with respect to the control terminal.

The driving device according to the above-described sixth configuration does not require a random number generation circuit or the like and thus has a simplified circuit configuration.

A switching power supply apparatus (100, 300) as described thus far has a configuration (a seventh configuration) including the driving device according to any of the above-described first to sixth configurations and the switching element.

The switching power supply apparatus according to the above-described seventh configuration is capable of suppressing loss and noise of the switching element.

A vehicle (X) as described thus far has a configuration (an eighth configuration) including the switching power supply apparatus according to the above-described seventh configuration.

The vehicle according to the above-described eighth configuration is capable of suppressing loss and noise of the switching element.

What is claimed is:

1. A driving device configured to drive a switching element, the driving device comprising a variation unit configured to vary a current supply capability with respect to a control terminal of the switching element during a period from startup to shutdown of the driving device, wherein the variation unit includes:

a plurality of first transistors configured to be individually controlled, at a time of turning on the switching element, to perform current supply to the control terminal and not to perform the current supply thereto; and a second transistor configured to perform current supply to the control terminal at the time of turning on the switching element, wherein the second transistor has a current supply capability with respect to the control terminal larger than a current supply capability of each of the plurality of first transistors with respect to the control terminal, and the second transistor and the plurality of first transistors are configured to operate in order of steps (i) to (v) at the time of turning on the switching element, wherein steps (i) to (v) are:

(i) performing the current supply from the second transistor to the control terminal;

(ii) performing the current supply from either the second transistor or the plurality of first transistors to the control terminal;

(iii) performing the current supply from both of the second transistor and the plurality of first transistors to the control terminal;

(iv) performing the current supply from either the second transistor or the plurality of first transistors to the control terminal; and (v) performing the current supply from the second transistor to the control terminal.

2. The driving device according to claim 1, wherein the variation unit includes a plurality of third transistors configured to be individually controlled, at a time of turning off the switching element, to perform current supply to the control terminal and not to perform the current supply thereto.

3. The driving device according to claim 2, comprising:

a fourth transistor configured to perform current supply to the control terminal at the time of turning off the switching element, wherein the fourth transistor has a current supply capability with respect to the control terminal larger than a current supply capability of each of the plurality of third transistors with respect to the control terminal.

4. The driving device according to claim 1, comprising:

a plurality of third transistors; and a fourth transistor configured to perform current supply to the control terminal at a time of turning off the switching element, wherein the fourth transistor has a current supply capability with respect to the control terminal larger than a current supply capability of each of the plurality of third transistors with respect to the control terminal.

5. The driving device according to claim 1, wherein the variation unit includes at least either a first variable current source and a first current mirror circuit configured to supply a mirror current obtained by mirroring an output current of the first variable current source to a turn-on transistor configured to perform current supply to the control terminal at the time of turning on the switching element or a second variable current source and a second current mirror circuit configured to supply a mirror current obtained by mirroring an output current of the second variable current source to a turn-off transistor configured to perform current supply to the control terminal at a time of turning off the switching element.

6. The driving device according to claim 1, wherein the variation unit is configured to regularly vary the current supply capability with respect to the control terminal.

7. A switching power supply apparatus, comprising: the driving device according to claim 1; and the switching element.

8. A switching power supply apparatus, comprising: the driving device according to claim 2; and the switching element.

9. A switching power supply apparatus, comprising: the driving device according to claim 3; and the switching element.

10. A switching power supply apparatus, comprising: the driving device according to claim 4; and the switching element.

11. A switching power supply apparatus, comprising: the driving device according to claim 5; and the switching element.

12. A switching power supply apparatus, comprising: the driving device according to claim 6; and the switching element.

13. A vehicle, comprising: the switching power supply apparatus according to claim 7.

14. The driving device according to claim 1, further comprising a clamper having a first end configured to receive application of a constant voltage and a second end connected to respective sources of the plurality of first transistors.

\* \* \* \* \*